United States Patent [19]

Grant et al.

[11] Patent Number: 5,023,865
[45] Date of Patent: Jun. 11, 1991

[54] BEAM POINTING MECHANISM

[75] Inventors: Michael Grant; David Robson, both of Stevenage, England

[73] Assignee: British Aerospace Public Lmited Company, London, England

[21] Appl. No.: 239,923

[22] Filed: Sep. 2, 1988

[30] Foreign Application Priority Data

Sep. 8, 1987 [GB] United Kingdom ............... 8721075

[51] Int. Cl.⁵ ............................................. H04J 14/06
[52] U.S. Cl. ................................. 370/3; 250/491.1
[58] Field of Search ................ 250/203.3, 491.1; 350/172, 438, 486, 602, 617, 623, 634, 636; 455/600, 606, 607, 617; 370/1, 3

[56] References Cited

U.S. PATENT DOCUMENTS

| | | | |
|---|---|---|---|
| 3,953,727 | 4/1976 | d'Auria et al. | 370/3 |
| 4,543,961 | 10/1985 | Brown | 370/3 |
| 4,702,548 | 10/1987 | Tanaka | 370/3 |
| 4,933,928 | 6/1990 | Grant et al. | 370/3 |

FOREIGN PATENT DOCUMENTS 3716896 12/1988 Fed. Rep. of Germany .......... 370/3

*Primary Examiner*—Reinhard J. Eisenzopf
*Assistant Examiner*—Leslie Van Beek
*Attorney, Agent, or Firm*—Nixon & Vanderhye

[57] ABSTRACT

This invention relates to mechanisms for steering or pointing transmitted optical radiation beams and/or the look directions from which optical radiation beams are received. It also relates to optical communications systems incorporating such mechanisms, more particularly but not exclusively interspacecraft communications systems.

2 Claims, 2 Drawing Sheets

BEAM POINTING MECHANISM

BACKGROUND OF THE INVENTION

1. Field of the Invention

This invention relates to mechanisms for steering or 'pointing' transmitted optical radiation beams and/or the 'look' directions from which optical radiation beams are received. It also relates to optical communications systems incorporating such mechanisms, more particularly but not exclusively inter-spacecraft communications systems.

2. Discussion of Prior Art

It has been proposed to communicate between spacecraft using laser radiation beams. Each craft is fitted with a communication terminal comprising a source for generating a collimated laser beam modulated with data to be transmitted, the beam being sent via a point-ahead device, a beam-splitter, a fine pointing mechanism and telescope optics to the other craft. The other craft returns to the first a modulated beam at a slightly different wavelength. This is received via the telescope optics and pointing mechanism of the first craft and split off from the transmission beam path by the beam splitter towards a receiver, i.e. an opto-electrical transducer and data decoder. Thus a full duplex communications link is set up between the two spacecraft. A portion of the received beam may be further split off and fed to a sensor array which senses deviation of the beam pointing direction and controls the pointing mechanism so as to track the other spacecraft. The function of the point-ahead device is to impart a relative angular displacement between the transmitted beam and the look direction in which the received beam is sought, i.e. to allow for the relative movement of the two craft during the time which it takes for the radiation to reach and return from the other craft. As well as the fine pointing mechanism which, the terminal may comprise a coarse printing mechanism is used to determine the general direction of the field of view of the communications terminal, the fine pointing mechanism being operable to track the other spacecraft within that field of view. The fine pointing mechanism may comprise two mirrors which receive the beam in succession and which are able to turn, driven by respective servo-mechanisms, about orthogonal axes.

It is desirable for any one craft to be able to communicate via respective duplex links, with more than one other spacecraft. This can be accomplished by fitting the craft with more than one terminal as described above but great advantage is obtained if a single multiplexing terminal, capable of handling a plurality of duplex beam pairs, could be provided. One proposal for such a multiplex terminal is set out in our U.S. Pat. No. 4,933,928. The several beam pairs handled by this apparatus are at different wavelengths and are multiplexed together by an arrangement of dichroic mirrors. Naturally, the beam pairs may need to be pointed in different directions and this is done, upstream of the multiplexing arrangement, by respective fine pointing mechanisms.

SUMMARY OF THE INVENTION

Both for use in a modification of the apparatus of our U.S. Pat. No. 4,933,928 and generally in relation to optical communication systems, the object of this invention is to provide a beam pointing or steering mechanism which can receive an optical beam comprising a plurality of components at different wavelengths and steer those components independently.

According to the invention, there is provided a pointing mechanism for receiving optical radiation comprising a plurality of different wavelength components and for independently controlling the pointing directions of the components, the mechanism comprising a first dichroic mirror for receiving said radiation and one or more further dichroic mirrors arranged in series with the first for receiving radiation transmitted by the previous mirror in the series, the mirrors having respective different reflectance wavelength bands for reflecting respective ones of said components and each mirror being mounted for turning movement to control the pointing direction of the component reflected thereby.

BRIEF DESCRIPTION OF THE DRAWINGS

For a better understanding of the invention reference will be made, by way of example, to the accompanying drawing, in which.

DETAILED DESCRIPTION OF THE DRAWINGS

Figure 1:
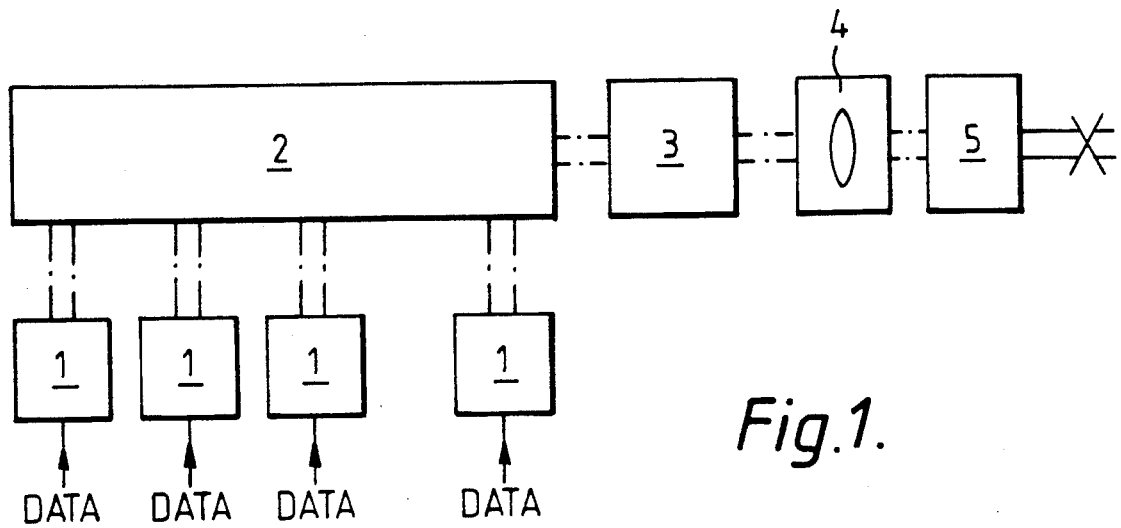
FIG. 1 is a diagrammatic view of part of a communication terminal.

The terminal of FIG. 1 is mounted on board a spacecraft (not shown) and comprises a series of component beam transmitter/receiver units 1 which supply data encoded component laser beams to a multiplexing arrangement 2. The multiplexed beam is passed to a pointing mechanism 3 which steers the component beams independently and passes them via telescope optics 4 and a coarse pointing mechanism 5 out towards other spacecraft (not shown). The return beams from the other spacecraft are received by the multiplexer arrangement 2 via the mechanism 5, optics 4 and mechanism 3 and are split off to the respective transmitter/receiver units 1.

Figure 2:
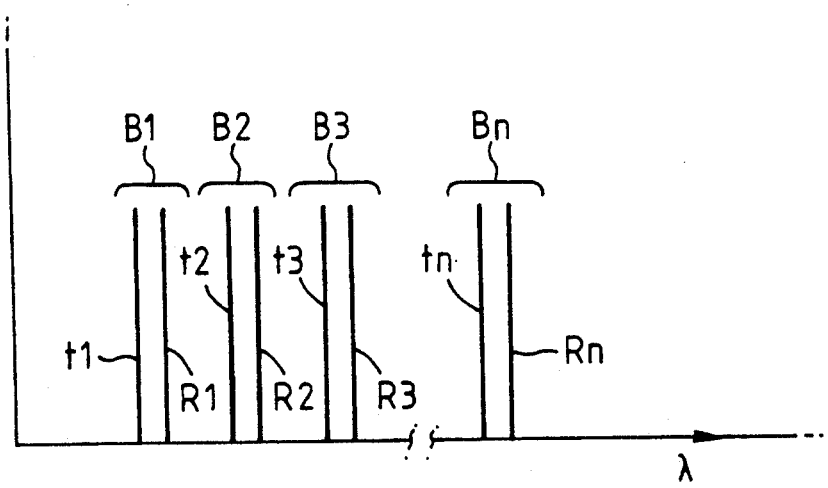
FIG. 2 is a diagram showing the wavelengths of the components of a radiation beam.

As shown in FIG. 2, the transmission beam components have respective wavelengths t1, t2 ... tn while the receive beam components have wavelengths r1, r2 ... rn. The transmission and receive beam components for each duplex link, i.e. for the link to any one other spacecraft, have adjacent wavelengths $t_1, r_1$ or $t_2, r_2$ or ... tn, rn.

Figure 3:
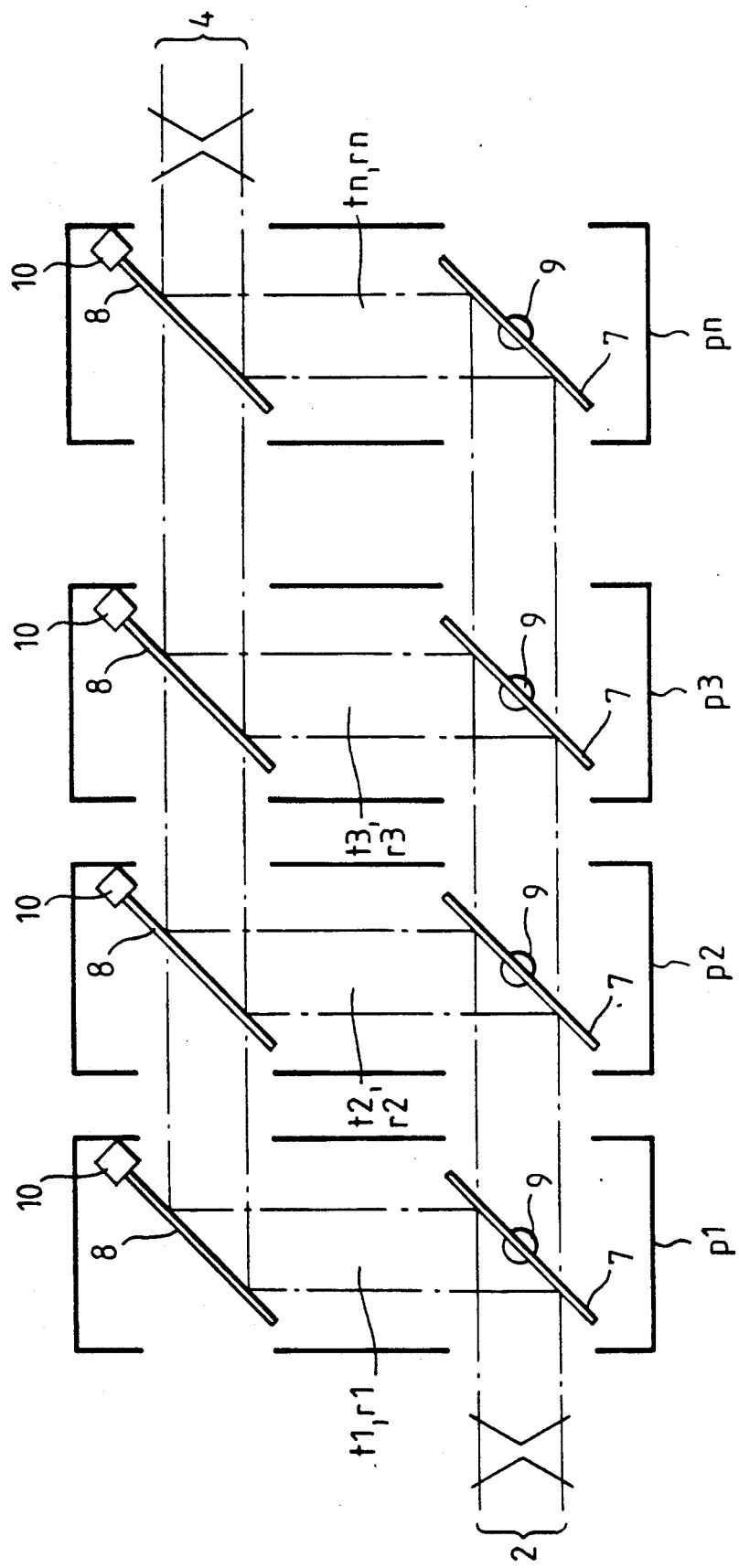
FIG. 3 is a diagrammatic view of a pointing mechanism used in the FIG. 1 apparatus.

As will be realised, the units 1 may incorporate point-ahead devices for deviating the transmission and receive directions of any one duplex beam pair. Meanwhile, as noted earlier, the pointing mechanism 3 steers the different beam pairs independently so as to track different ones of the other spacecraft. As shown in FIG. 3, it comprises a series of pointing units p1 to pN each containing a pair of dichroic mirrors 7 and 8 which are able to be turned, by respective servo-mechanisms 9 and 10 (only very diagrammatically shown), about respective orthogonal axes x and y. Thus, each pointing unit p1 to pN is somewhat similar in construction to the example of a fine pointing mechanism described earlier. One difference however, is that the mirrors 7 and 8 are dichroic mirrors, the two mirrors of any one pointing unit each having a reflective bandwidth. B1, B2 ... or Bn in FIG. 2 which is just sufficient to include the wavelengths t1, r1 or t2, r2 ... or tn, rn of a corresponding respective one of the duplex beam pairs. Thus, in unit p1, the mirrors each have a reflectance bandwidth B1 so that the transmission beam component having wavelength t1 is reflected by mirror 7 up to mirror 8 where it is again reflected out through the mirrors 8 in the other units. Meanwhile, the receive beam component having wavelength r1 passes through all the mirrors 8 in units p2 to pn and is only reflected by the mirror 8 in unit p1 from whence it passes down to be reflected by mirror 7 in unit p1 towards the multiplexing arrangement 2 of FIG. 1. The other transmission beam components, having wavelength t2 to tn are passed, unreflected by the mirror 7 in unit p1, onto the other units. As noted, the mirrors 7 and 8 in these other units have respective reflectance bands B2 to BN so the different transmission beam components become split off progressively in respective ones of the units and then re-multiplexed into the optics 4 of FIG. 1. Similarly, the receive beam components are split off progressively by corresponding ones of the units and then re-multiplexed into the multiplexing arrangement 2. Whilst split off, the different duplex beam pairs are subjected to the steering or pointing action of the mirrors 7 and 8 within the respective units.

As will be appreciated, the number n is optional, i.e. as many pointing units 1 as are required can be cascaded to make up the overall pointing mechanism of FIG. 3, the maximum allowable number being determined by factors such as the loss to which each component beam is subjected at each mirror through which it is transmitted, the degree of cross-talk which might occur and so on. A further limitation arises when the beam deviation within unit p1 is sufficient to cause the relevant transmission beam to hit the structure supporting the mirror 8 in the last unit Pn—this is dependent also on the size of the mirrors and may in any case be affected by the aperture size of the telescope optics 4.

We claim:

1. A pointing mechanism for receiving optical radiation comprising a plurality of different wavelength components and for independently controlling the pointing directions of the components, the mechanism comprising:

a first dichroic mirror for receiving said radiation; and at least one further dichroic mirror arranged in series with the first dichroic mirror for receiving radiation transmitted by a previous mirror each in the series, the mirrors having respective different reflectance wavelength bands for reflecting respective ones of said components and each mirror being mounted for turning movement to control the pointing direction of the component reflected thereby.

2. A pointing mechanism according to claim 1, including for each of said first mirror and each further mirror, another dichroic mirror having the same reflectance wavelength band as the associated first or further mirror, mounted for turning about an axis orthogonal to the turning axis of the associated first or further mirror, and positioned to receive the radiation component reflected by the associated first or further mirror and to further reflect said component such that, after such further reflection, all the components travel in the same general direction.

* * * * *